(12) United States Patent  
Saberan (10) Patent No.: US 7,581,792 B2
(45) Date of Patent: Sep. 1, 2009

(54) VEHICLE SEAT FRAME STRUCTURE AND METHOD OF ASSEMBLING A PORTION OF A VEHICLE SEAT FRAME

(75) Inventor: Mohammad Saberan, New Baltimore, MI (US)

(73) Assignee: Lear Corporation, Southfield, MI (US)

( * ) Notice: Subject to any disclaimer, the term of this patent is extended or adjusted under 35 U.S.C. 154(b) by 798 days.

(21) Appl. No.: 11/146,795

(22) Filed: Jun. 7, 2005

(65) Prior Publication Data

US 2006/0273649 A1 Dec. 7, 2006

(51) Int. Cl.
*A47C 7/02* (2006.01)
(52) U.S. Cl. ............................. 297/452.18; 297/452.19; 297/216.12; 297/408
(58) Field of Classification Search ............ 297/452.18, 297/452.19, 216.12, 408
See application file for complete search history.

(56) References Cited

U.S. PATENT DOCUMENTS

| | | | |
|---|---|---|---|
| 1,237,956 A | 8/1917 | Pue | |
| 2,647,791 A | 8/1953 | Barenyi | |
| 3,446,526 A | 5/1969 | Peters | |
| 3,632,157 A | 1/1972 | Lohr | |
| 3,669,498 A | 6/1972 | Meyers et al. | |
| 3,702,204 A | 11/1972 | Tipton et al. | |
| 3,727,977 A | 4/1973 | Gmeiner | |
| 3,799,577 A | 3/1974 | Colucci | |
| 3,861,747 A | 1/1975 | Diamond | |
| 3,896,531 A | 7/1975 | Gorman | |
| 3,983,640 A | 10/1976 | Cardullo et al. | |
| 4,036,527 A | 7/1977 | Faul | |
| 4,124,251 A | 11/1978 | Petersen | |
| 4,127,301 A | 11/1978 | Syrowik | |
| 4,198,091 A | 4/1980 | Appleton | |
| 4,305,616 A | 12/1981 | Martinez | |
| 4,443,034 A | 4/1984 | Beggs | |
| 4,479,675 A | 10/1984 | Zankl | |
| 4,509,796 A | 4/1985 | Takagi | |
| 4,524,762 A | 6/1985 | Schulman | |
| 4,526,421 A | 7/1985 | Brennan et al. | |
| 4,585,273 A | 4/1986 | Higgs et al. | |
| 4,595,238 A * | 6/1986 | Goldner ................. 297/452.18 |
| 4,601,517 A | 7/1986 | Heesch | |
| 4,602,817 A | 7/1986 | Raftery | |
| 4,681,367 A | 7/1987 | Timmers | |
| 4,746,168 A | 5/1988 | Bracesco | |
| 4,875,736 A | 10/1989 | Brambilla | |
| 4,881,702 A | 11/1989 | Slettebak | |
| 4,900,085 A | 2/1990 | Tobler | |

(Continued)

FOREIGN PATENT DOCUMENTS

DE 2605952 8/1977

(Continued)

*Primary Examiner*—Laurie K Cranmer
(74) *Attorney, Agent, or Firm*—MacMillan, Sobanski & Todd, LLC (57) ABSTRACT

A vehicle seat frame includes a first upper back frame member having at least one tab suitable for supporting to a dynamic head restraint system. The first upper back frame member has upper and lower mating surfaces suitable for attachment to upper and lower mating surfaces of a second upper back frame member operable to support a non-dynamic head restraint system.

14 Claims, 4 Drawing Sheets

U.S. PATENT DOCUMENTS

| | | | |
|---|---|---|---|
| 4,932,720 A | 6/1990 | Sherman | |
| 4,973,105 A | 11/1990 | Itou | |
| 5,007,682 A | 4/1991 | Kuwabara et al. | |
| 5,011,208 A | 4/1991 | Lewallen | |
| 5,171,054 A | 12/1992 | Wilson | |
| 5,286,084 A | 2/1994 | Bart | |
| 5,288,122 A | 2/1994 | Pilhall | |
| 5,301,914 A | 4/1994 | Yoshida et al. | |
| 5,310,154 A | 5/1994 | Ueda et al. | |
| 5,358,307 A | 10/1994 | Shafer et al. | |
| 5,366,270 A | 11/1994 | Heussner et al. | |
| 5,385,384 A | 1/1995 | Gierman et al. | |
| 5,397,170 A * | 3/1995 | Shrock | 297/452.18 |
| 5,439,271 A | 8/1995 | Ryan | |
| 5,443,239 A | 8/1995 | Laporte | |
| 5,464,273 A | 11/1995 | Makoto | |
| 5,468,050 A | 11/1995 | Hall et al. | |
| 5,472,165 A | 12/1995 | Gruber | |
| 5,485,976 A | 1/1996 | Creed et al. | |
| 5,492,361 A | 2/1996 | Kim | |
| 5,509,722 A | 4/1996 | Beroth | |
| 5,529,376 A | 6/1996 | Jovan et al. | |
| 5,547,259 A | 8/1996 | Fredrick | |
| 5,568,959 A | 10/1996 | Weber et al. | |
| 5,570,930 A | 11/1996 | LaPointe et al. | |
| 5,575,533 A | 11/1996 | Glance | |
| 5,607,204 A | 3/1997 | Gryp | |
| 5,609,395 A | 3/1997 | Burch | |
| 5,626,396 A * | 5/1997 | Kuragano et al. | 297/452.2 |
| 5,775,780 A | 7/1998 | Murphy et al. | |
| 6,375,262 B1 * | 4/2002 | Watanabe | 297/284.4 |
| 6,783,177 B1 * | 8/2004 | Nakano | 297/216.12 |
| 6,789,845 B2 * | 9/2004 | Farquhar et al. | 297/216.12 |
| 6,955,397 B1 * | 10/2005 | Humer | 297/216.12 |
| 7,044,544 B2 * | 5/2006 | Humer et al. | 297/216.12 |
| 7,066,552 B2 * | 6/2006 | Yoshida | 297/452.18 |
| 7,104,602 B2 * | 9/2006 | Humer et al. | 297/216.12 |
| 7,237,838 B2 * | 7/2007 | Hoffmeister et al. | 297/216.12 |
| 2004/0113481 A1 | 6/2004 | Saberan | |

FOREIGN PATENT DOCUMENTS

| | | |
|---|---|---|
| EP | 308374 | 3/1989 |
| EP | 1 211 129 A1 | 6/2002 |
| EP | 1 134 115 A3 | 3/2003 |
| FR | 2698832 | 6/1994 |
| GB | 2 297 687 A | 8/1996 |
| GB | 2 419 284 A | 4/2006 |
| JP | 0205238 | 12/1982 |
| JP | 2000 12782305 | 5/2000 |
| WO | 97/19727 | 6/1997 |

* cited by examiner

VEHICLE SEAT FRAME STRUCTURE AND METHOD OF ASSEMBLING A PORTION OF A VEHICLE SEAT FRAME

BACKGROUND OF THE INVENTION

This invention relates in general to vehicle seat frame structures. Typically, seats for use in automotive vehicles vary in size, shape, style, and function for each particular vehicle platform. Typically, each different model of seat is manufactured with a unique frame structure provided for each vehicle platform. The size and shape of the frame structure generally conforms to the size, and shape of a particular seat model to be implemented in a particular vehicle. The style and function of the frame structure is generally determined by consumer desire for appearance and utility. Since each seat model is commonly manufactured with its own unique frame structure, the seat frame structure is generally manufactured for each model specific to the size, shape, style, and function of that particular model and portions of the seat frame structure are typically not interchangeable between different seat models as size, shape, style, and function are varied, regardless of vehicle platform or original equipment manufacturer.

BRIEF SUMMARY OF THE INVENTION

This invention relates in general to a vehicle seat frame structures and more specifically to an improved seat frame structure for use in a vehicle and a method of assembling a portion of the seat frame.

The vehicle seat frame includes a first upper back frame member having at least one tab suitable for supporting a dynamic head restraint system. The first upper back frame member has upper and lower mating surfaces suitable for attachment to upper and lower mating surfaces of a second upper back frame member operable to support a non-dynamic head restraint system.

The method of assembling a portion of a vehicle seat frame includes the steps of: providing a first upper back frame member having at least one tab suitable for supporting a dynamic head restraint system, the upper back frame member having upper and lower mating surfaces and operable to support a non-dynamic head restraint system; providing one of a second upper back frame member operable to support a non-dynamic head restraint system and a third upper back frame member operable to support a dynamic head restraint system, the second and the third upper back frame members each including upper and lower mating surfaces suitable for attachment to the upper and lower mating surfaces of the first upper back frame member; positioning the one of the second and the third upper back frame members relative to the first upper back frame member, such that the mating surfaces of the one of the second and third upper back frame members are aligned relative to the mating surfaces of the first upper back frame member; and attaching the respective mating surfaces of the one of the first and the second upper back frame member to the mating surfaces of the third upper back frame member.

Various objects and advantages of this invention will become apparent to those skilled in the art from the following detailed description of the preferred embodiment, when read in light of the accompanying drawings.

DETAILED DESCRIPTION OF THE INVENTION

Preliminarily, it must be noted that directional labels such as upper, lower, top bottom, above, below, over, and under are used with respect to the orientation of the figure under discussion on the page, and are not intended as limitations upon the orientation of the structure of the invention actual use.

Figure 1:
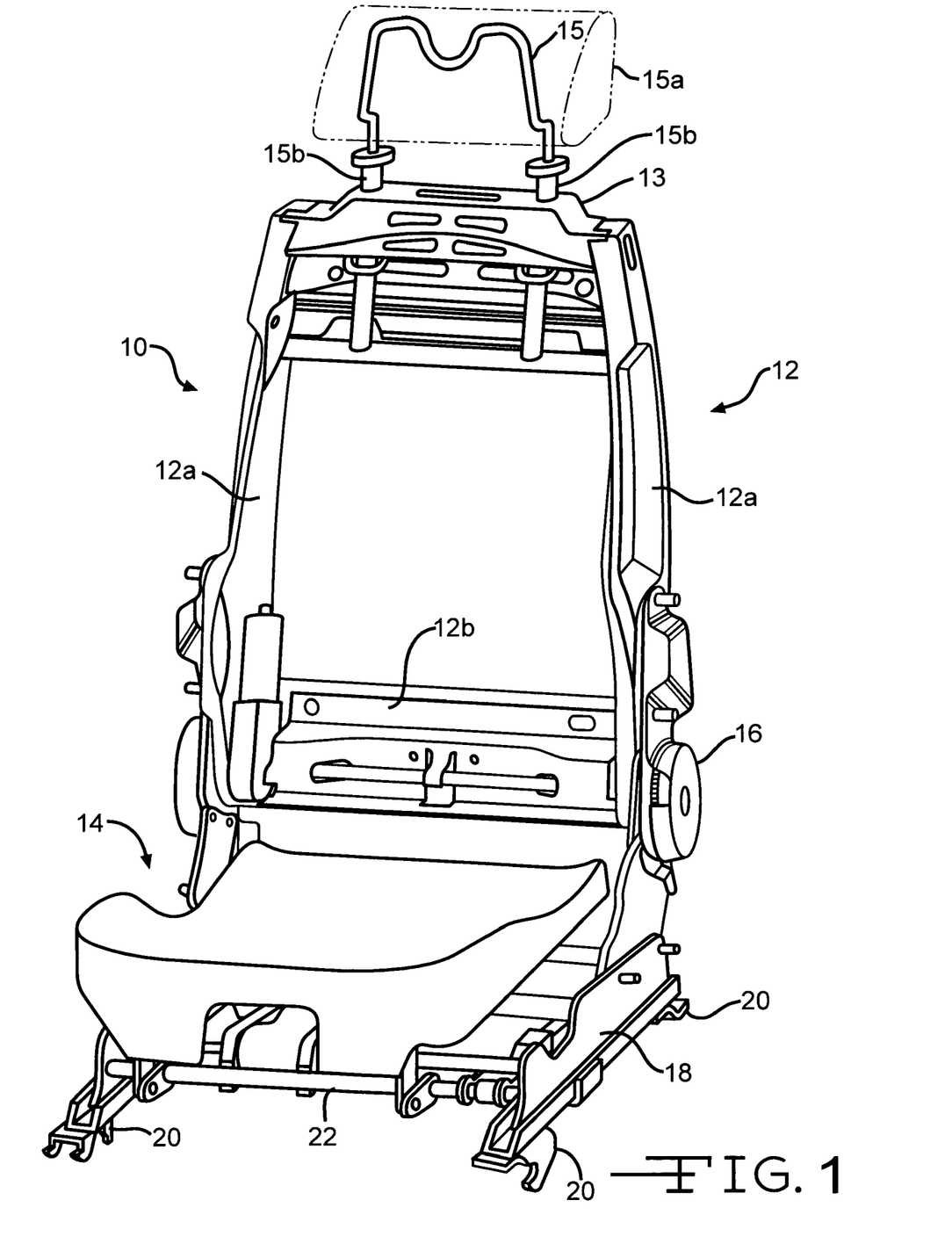
FIG. 1 is a perspective view of a seat structure having a frame manufactured in accordance with a first embodiment of the present invention.

Referring now to the drawings, there is illustrated in FIG. 1 a vehicle seat frame structure, indicated generally at 10. The seat frame structure 10 generally includes a seat back frame, indicated generally at 12, and a seat bottom frame, indicated generally at 14. The frames 12 and 14 are suitable to support cushion assemblies (not shown) for supporting an occupant of the seat frame structure 10.

The back frame 12 and the bottom frame 14 are attached to one another via a recliner 16. The recliner 16 can be any conventional recliner mechanism, such as manually or electrically operated, which selectively permits the back frame 12 to pivot relative to the bottom frame 14. The seat frame structure 10 further includes a seat adjuster 18 operatively mounted to the bottom frame 14. The adjuster 18 includes mounting structures 20 for securing the adjuster 18 to a floor or frame of a vehicle. The adjuster 18 includes two pairs of upper and lower tracks slidably disposed relative to one another. The upper tracks are mounted on the bottom frame 14, and the lower tracks are mounted on the vehicle floor via the mounting structures 20. The adjuster 18 can be any suitable conventional seat adjuster mechanism for permitting the seat frame structure 10 to move in a fore and aft direction relative to the vehicle floor. The adjuster 18 can also include a conventional lift mechanism 22 for permitting the front and rear portions of the bottom frame 14 to move in generally vertical directions relative to the adjuster 18 and floor of the vehicle. Alternatively, the seat back frame 12 could be pivotally connected to the recliner 16 instead of the bottom frame 14 to permit the lift mechanism 22 to move the bottom frame 14 independent of the back frame 12.

The seat back frame 12 generally includes a pair of generally vertical side members 12a. The lower portion of the side frame members 12a are attached together by a generally horizontally extending lower cross member 12b. The upper portions of the side members 12a are attached together by an upper back frame portion 13. The upper back frame portion 13 is suitable for attaching a headrest frame indicated generally at 15. As shown in FIG. 1, the headrest frame 15 is a frame for supporting a movable non-dynamic headrest indicated schematically at 15*a*. The term non-dynamic headrest refers to a headrest which may or may not be adjustable in the vertical direction or slightly tiltable, but does not move in a generally horizontal direction. Contrary dynamic head-restraint systems include headrests which are generally moveable in a horizontal direction, and sometimes also in a vertical direction, towards the head of a seat occupant. The headrest is moveably mounted on a head restraint mechanism which is actuated, such as upon detection of a rearward impact or due to physical movement of the occupant against the seat back, to position the head rest closer to the head of the occupant to help reduce injury, such as whiplash. An example of a dynamic head restraint system for use with the present invention is disclosed in U.S. Pat. No. 6,789,845 which is hereby incorporated by reference.

Figure 2:
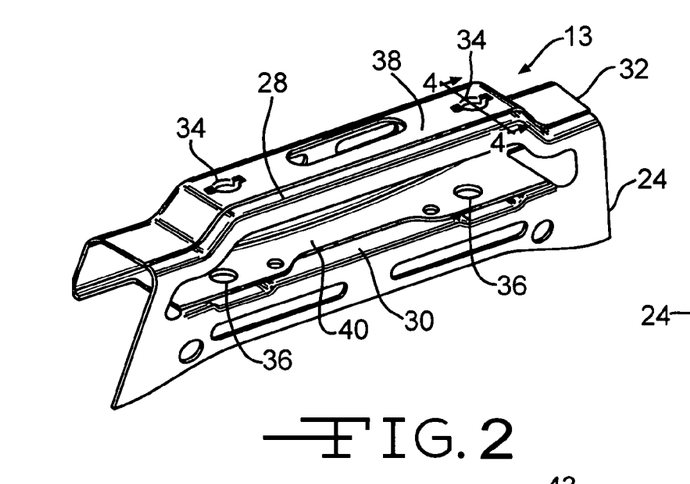
FIG. 2 is an enlarged perspective view of a portion of the frame of the seat frame structure of FIG. 1.
Figure 3:
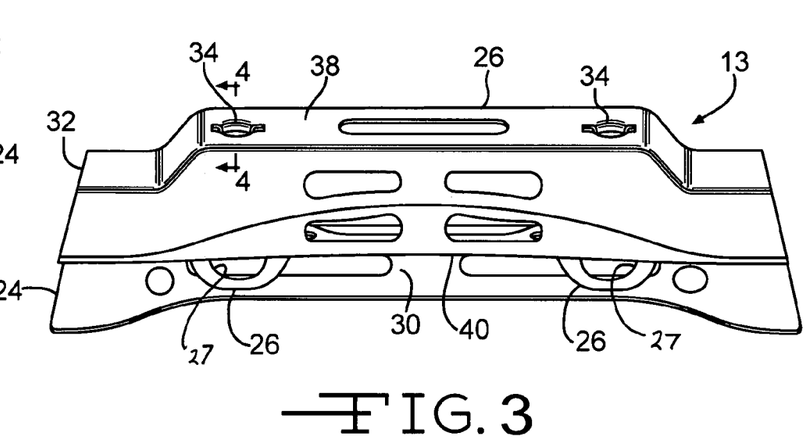
FIG. 3 is a front perspective view of the seat frame portion of FIG. 2.
Figure 4:
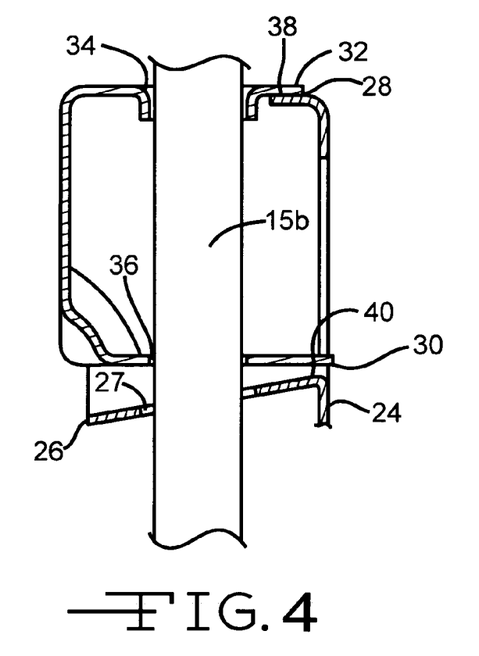
FIG. 4 is a sectional view of the seat frame portion taken along lines 4-4 in FIGS. 2 and 3.

As best shown in FIGS. 2-4, the upper back frame portion 13 is generally a two piece frame member including a first upper back frame member 24 and a second upper back frame member 32. As will be explained below, different head rest frames can be configured by utilizing a common first upper back frame member 24, and replacing the second upper back frame member 32 with other upper back frame members. For example different head rest frames can be configured for mounting dynamic head restraint systems or non-dynamic head rests, while reducing cost and design analysis by utilizing the common first upper back frame member 24.

The first upper back frame member 24 has two support members or tabs 26. The tabs 26 preferably include slots, recesses, or apertures 27 formed therein, the reason for which will be explained below. The tabs 26 are suitable for supporting a dynamic head restraint system, e.g., a headrest that is suitable to pivot relative to the back frame 12. While the first upper back frame member 24 is shown with two tabs 26, it must be understood, however, that the first upper back frame member may have any suitable number of tabs. The first upper back frame member 24 has upper and lower mating surfaces 28 and 30. The upper and lower mating surfaces 28 and 30 are suitable for attachment to upper and lower mating surfaces of the second upper back frame member 32 operable to support a non-dynamic head restraint system, as will be further described below.

The second upper back frame member 32 is operable to support a non-dynamic head restraint system. The second upper back frame member 32 includes two upper guide holes 34 to provide guidance to support posts 15*b* of the head rest frame 15. The second upper back frame member 32 includes two lower guide holes 36 to provide guidance and/or a stop limit to the support posts 15*b* of the head rest frame 15. Generally, the guide holes provide lateral or horizontal support for the support posts 15*b* received therein. The second upper back frame member 32 includes upper and lower mating surfaces 38 and 40 suitable for attachment to the upper and lower mating surfaces 28 and 30 of the first upper back frame member 24. As can be seen from FIG. 4, the guide holes 34 and 36 are in general vertical alignment with the apertures 27. In this configuration, the apertures 27 mainly just provide clearance for the support posts 15*b*.

Preferably the first upper back frame member 24 and the second upper back frame member 32 are formed from a stamped sheet of metal. However, it must be understood that the first upper back frame member 24 and the second upper back frame member 32 may be formed from any suitable material in any suitable manner.

The upper and lower mating surfaces 28, 30, 38, and 40 of the first and the second upper back frame members 24 and 32 are preferably flat planar surfaces. However, it must be understood that the mating surfaces may be any suitable surface for securing the first upper back frame member 24 and the second upper back frame member 32 relative to one another. Preferably, the first upper back frame member 24 and the second upper back frame member 32 are secured to one another by welding portions of the upper and lower mating surfaces 28, 30, 38 and 40 together by spot welding. However, it must be understood that the first upper back frame member 24 and the second upper back frame member 32 may be secured together in any suitable manner.

Figure 5:
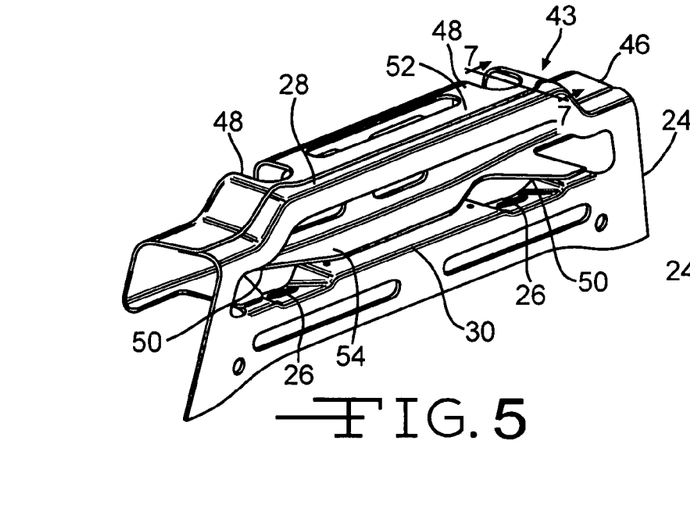
FIG. 5 is a perspective view of a second seat frame portion in accordance with the first embodiment of the present invention utilizing the first upper back frame member of FIGS. 2 and 3.
Figure 6:
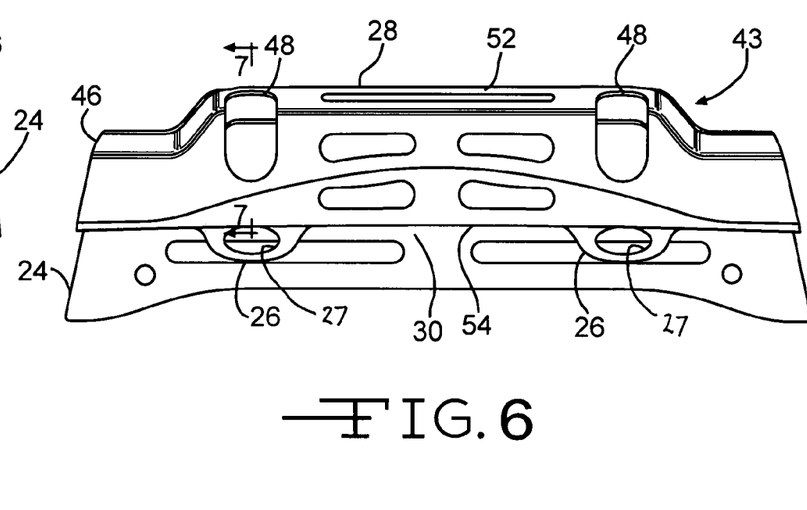
FIG. 6 is a front perspective view of the second seat frame portion of FIG. 5.
Figure 7:
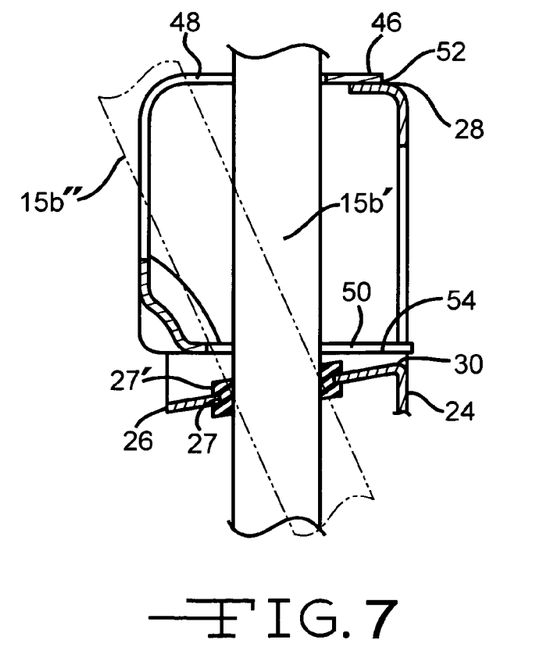
FIG. 7 is a sectional view of the seat frame portion taken along lines 7-7 in FIGS. 5 and 6.

Now referring to FIGS. 5-7, the present invention also contemplates another upper back frame portion 43. The upper back frame portion 43 is suitable for attaching a headrest frame (not shown) that is suitable to be used as a dynamic headrest.

The upper back frame portion 43 includes the first upper back frame member 24, but essentially replaces the second upper back frame member 32 with a third upper back frame member 46. The third upper back frame member 46 is operable to support and/or permit operation of a dynamic head restraint system.

The third upper back frame member 46 includes two upper guide slots 48 to provide guidance to and allow pivotal rotation, horizontal movement, and/or vertical movement of support posts 15*b'* of a dynamic head restraint system. As illustrated in FIG. 7, the guide slots 48 permit the support posts 15*b'* to move from a normal generally vertical position to a pivoted position, indicated by phantom lines 15*b"*, such as upon activation of the dynamic head restraint system. The posts 15*b'* are typically in the position shown in solid lines at 15*b'* and move to the position in phantom, 15*b"*, upon activation of the dynamic head restraint system. The posts 15*b'* move either vertically and/or horizontally, or in a rotational motion as guided by the tabs 26.

The tabs 26 and apertures 27 provide pivoting and/or sliding guiding structures for the movement of the guide posts 15*b'*. As shown in FIG. 7, an optional guidance structure, or bushing, 27' is disposed in the aperture 27 of the tab 26 and provides attachment for and/or guidance of the posts 15*b'* relative to the tabs 26. The guidance structure 27' for the guide posts 15*b'* may function as a fulcrum, or as an attachment, upon which the guide posts 15*b'* pivot. The present invention includes other embodiments in which the posts 15*b'* are configured such that the posts 15*b'* interface directly with the tabs 26 via the edge of the aperture 27, thus, not including an intermediate device (between the posts 15*b'* and the tabs 26), such as the guidance structure 27'.

The guidance structure 27', as shown in FIG. 7, is a generally annular resilient elastomeric bushing. It must be understood, however, that the guidance structure 27' may be any suitable intermediate device formed in any suitable shape from any suitable material. For example, the intermediate device may be an arrangement of tangs cooperating with grooves formed on the posts 15*b'*, or any other suitable arrangement. For further example, the intermediate device may be made of a hardened plastic, deformable metal, or any other suitable material.

The third upper back frame member 46 includes two lower guide slots 50 to provide horizontal clearance and allow free movement of the support posts 15*b'* of the dynamic head restraint system when the dynamic head rest is in movement. The third upper back frame member 46 includes upper and lower mating surfaces 52 and 54 suitable for attachment to the upper and lower mating surfaces 28 and 30 of the first upper back frame member 24.

Preferably the first upper back frame member 24 and the third upper back frame member 46 are formed from a stamped sheet of metal. However, it must be understood that the first upper back frame member 24 and the third upper back frame member 46 may be formed from any suitable material in any suitable manner.

The upper and lower mating surfaces 28, 30, 52, and 54 of the first and the third upper back frame members 24 and 46 are preferably flat planar surfaces. However, it must be understood that the mating surfaces may be any suitable surface for securing the first upper back frame member 24 and the third upper back frame member 46 relative to one another. Preferably, the first upper back frame member 24 and the third upper back frame member 46 are secured to one another by welding portions of the upper and lower mating surfaces 28, 30, 52 and 54 together by spot welding. However, it must be understood that the first upper back frame member 24 and the third upper back frame member 46 may be secured together in any suitable manner.

As stated above, the back frame 12 is adapted to receive different types of headrests/head restraint systems. Thus, different seat assemblies having different characteristics, such as non-dynamic or dynamic head restraint systems, can be formed using a common bottom frame 14, and by using either the second or third upper back frame member 32 or 46 to form the upper back frame portion 13 or 43 of the back frame 12. The back frame 12 can thus be adapted to receive different types of headrest/head restraint components such as by including or not including multiple features and mounting structures, such as holes and slot.

Figure 8:
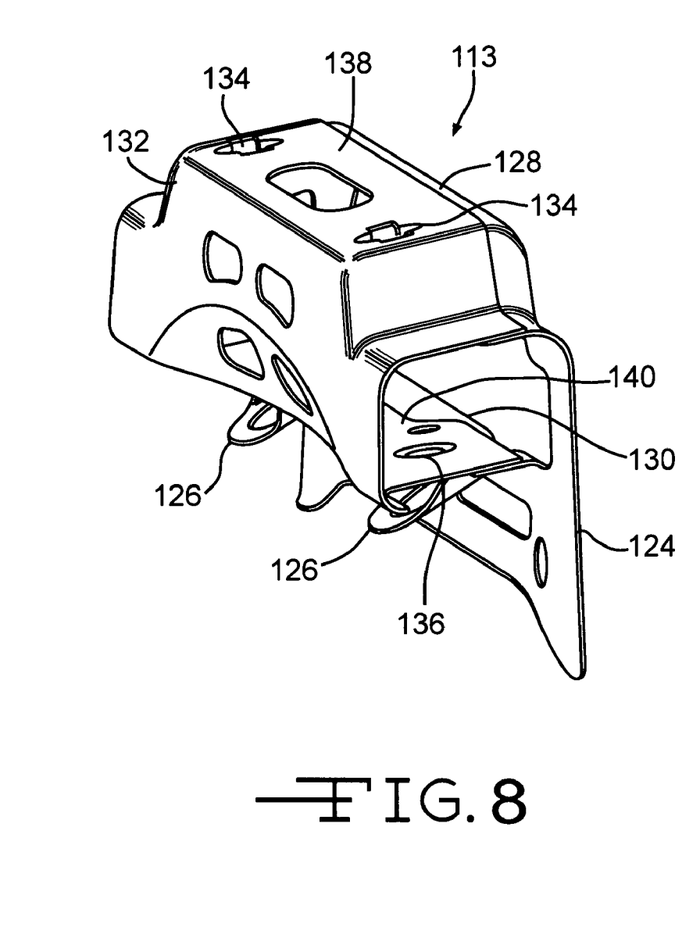
FIG. 8 is a perspective view of a third seat frame portion in accordance with a second embodiment of the present invention.
Figure 9:
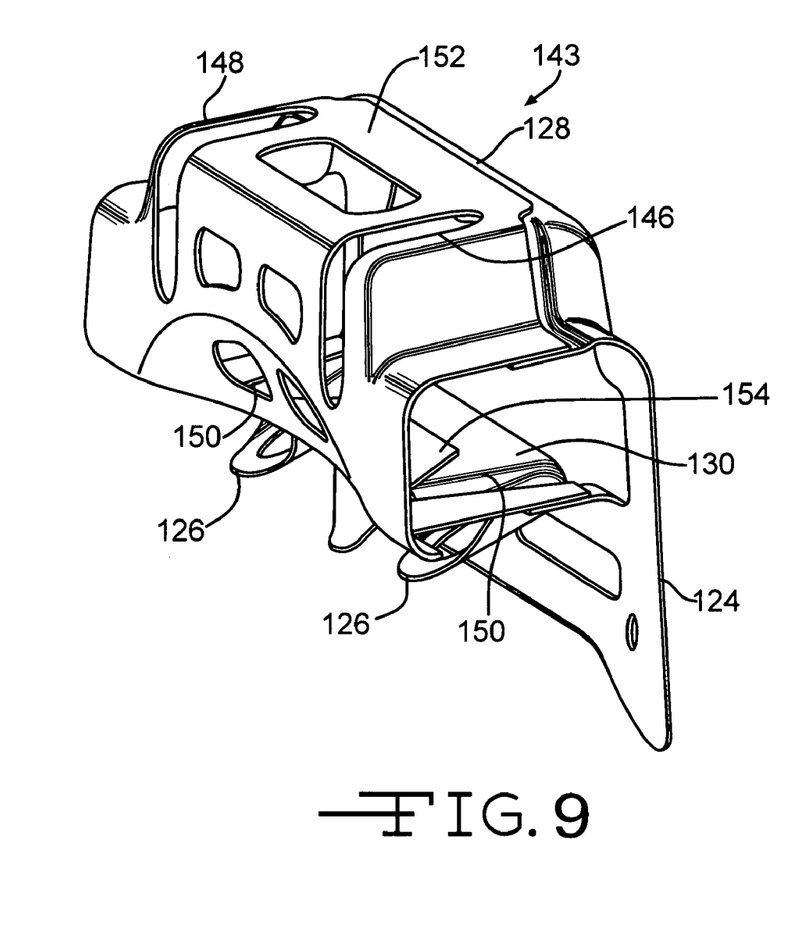
FIG. 9 is a perspective view of a fourth seat frame portion in accordance with the second embodiment of the present invention utilizing the first upper back frame member of FIG. 8.

Referring now to FIGS. 8 and 9, there is illustrated upper frame portions 113 and 143 of second embodiment of the present invention. The embodiment illustrated in FIGS. 8 and 9 is similar to the embodiment illustrated in FIGS. 1-7 and similar elements therein have been numbered using corresponding numbers incremented by '100'.

The present invention also contemplates a method of assembling a portion of a vehicle seat frame. In one embodiment the method includes the steps of: providing a first upper back frame member (formed from a stamped sheet) having at least one tab suitable for supporting a dynamic head restraint system, the first upper back frame member having upper and lower mating surfaces and operable to support a non-dynamic head restraint system; providing one of a second upper back frame member operable to support a non-dynamic head restraint system and a third upper back frame member operable to support a dynamic head restraint system, the one of the second and third upper back frame members (formed from a stamped sheet) and including upper and lower mating surfaces suitable for attachment to the upper and lower mating surfaces of the first upper back frame member, wherein the upper and lower mating surfaces of the first and the one of the second and the third upper back frame members are flat planar surfaces; positioning the one of the second and the third upper back frame members relative to the first upper back frame member, such that the mating surfaces of the one of the second and the third upper back frame members are aligned relative to the mating surfaces of the first upper back frame member; and attaching the respective mating surfaces of the one of the second and the third upper back frame member to the mating surfaces of the first upper back frame member, wherein the first upper back frame member and the one of the second and the third upper back frame members are preferably secured relative to one another by welding portions of the upper and lower mating surfaces of the first and the one of the second and the third upper back frame members together by spot welding.

While the principle and mode of operation of this invention have been explained and illustrated with regards to particular embodiments, it must be understood, however, that this invention may be practiced otherwise than as specifically explained and illustrated without departing from its spirit or scope.

What is claimed is:

1. A method of assembling a portion of a vehicle seat frame comprising the steps of:
   a. providing a first upper back frame member having at least one tab suitable for supporting a dynamic head restraint system, the upper back frame member having upper and lower mating surfaces and operable to support a non-dynamic head restraint system;
   b. providing one of a second upper back frame member operable to support a non-dynamic head restraint system and a third upper back frame member operable to support a dynamic head restraint system, the one of the second and third upper back frame members including upper and lower mating surfaces suitable for attachment to the upper and lower mating surfaces of the first upper back frame member;
   c. positioning the one of the second and the third upper back frame members relative to the first upper back frame member, such that the mating surfaces of the one of the second and the third upper back frame members are aligned relative to the mating surfaces of the first upper back frame member; and
   d. attaching the respective mating surfaces of the one of the second and the third upper back frame member to the mating surfaces of the first upper back frame member.

2. The method of claim 1 wherein the upper and lower mating surfaces of the first and the one of the second and the third upper back frame members are flat planar surfaces.

3. The method of claim 1 further comprising the step of securing the first upper back frame member and the one of the second and the third upper back frame members are relative to one another.

4. The method of claim 3 wherein the first upper back frame member and the one of the second and the third upper back frame members are secured relative to one another by welding portions of the upper and lower mating surfaces of the first and the one of the second and the third upper back frame members together.

5. The method of claim 4 wherein the portions of the upper and lower mating surfaces of the first and the one of the second and the third upper back frame members are welded together by spot welding.

6. The method of claim 1 further comprising the step of forming the first upper back frame member from a stamped sheet.

7. The method of claim 1 further comprising the step of forming the one of the second and the third upper back frame members from a stamped sheet.

8. A method of assembling a seat frame structure comprising the steps of:
   a. providing a portion of a seat frame structure including a seat back frame, a seat bottom frame, and a first upper back frame member;
   b. providing a second upper back frame member that is operable to support a non-dynamic head restraint system;
   c. providing a third upper back frame member that is operable to support a dynamic head restraint system;
   d. selecting one of the second upper back frame member and the third upper back frame member that corresponds to a desired configuration for the seat frame structure; and e. securing the selected one of the second upper back frame member and the third upper back frame member to the first upper back frame member to provide a seat frame structure.

9. The method of claim 8 wherein step (a) is performed by providing the first upper back frame member with a tab that is suitable for supporting a dynamic head restraint system.

10. The method of claim 8 wherein step (a) is performed by providing the first upper back frame member with a pair of tabs that is suitable for supporting a dynamic head restraint system.

11. The method of claim 8 wherein step (a) is performed by providing the first upper back frame member with upper and lower mating surfaces, and wherein step (e) is performed by securing the selected one of the second upper back frame member and the third upper back frame member to the upper and lower mating surfaces of the first upper back frame member.

12. The method of claim 8 wherein step (a) is performed by providing the first upper back frame member with upper and lower mating surfaces, step (b) is performed by providing the second upper back frame member with upper and lower mating surfaces, step (c) is performed by providing the third upper back frame member with upper and lower mating surfaces, and step (e) is performed by securing the upper and lower mating surfaces of the selected one of the second upper back frame member and the third upper back frame member respectively to the upper and lower mating surfaces of the first upper back frame member.

13. The method of claim 12 wherein the upper and lower mating surfaces of the first, second, and third upper back frame members are flat and planar in shape.

14. The method of claim 8 wherein the first, second, and third upper back frame members are each formed by stamping.

\* \* \* \* \*

UNITED STATES PATENT AND TRADEMARK OFFICE
CERTIFICATE OF CORRECTION

PATENT NO.       : 7,581,792 B2  Page 1 of 1
APPLICATION NO. : 11/146795
DATED            : September 1, 2009
INVENTOR(S)      : Mohammad Saberan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this

Fourteenth Day of September, 2010

David J. Kappos
*Director of the United States Patent and Trademark Office*